US 6,678,312 B1
Jan. 13, 2004

(54) METHOD FOR EXTENDING DIGITAL RECEIVER SENSITIVITY USING ANALOG CORRELATION

(75) Inventor: Rishi Mohindra, Milpitas, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/469,322

(22) Filed: Dec. 22, 1999

(51) Int. Cl.[7] .......................... H04B 15/00; H04K 1/00; H04L 27/30
(52) U.S. Cl. .................. 375/150; 375/149; 375/142; 375/343
(58) Field of Search ................................ 375/147, 149, 375/150, 140–142, 145, 343, 340, 329; 455/343; 341/155

(56) References Cited

U.S. PATENT DOCUMENTS 5,675,339 A * 10/1997 Andren et al. .............. 341/155
5,694,417 A * 12/1997 Andren et al. .............. 375/150
6,028,887 A * 2/2000 Harrison et al. ............ 375/147

OTHER PUBLICATIONS

"Extending Digital Receiver Sensitivity Using Analog Correlation" IEEE 802.11 b Standard, Supplement, Part 11, p. 10, Apr. 1999.

* cited by examiner

Primary Examiner—Phoung Phu
(74) Attorney, Agent, or Firm—Michael E. Schmitt

(57) ABSTRACT

Analog correlation techniques are used in a digital receiver portion of a spread spectrum transceiver to determine when to turn ON given digital receiver components. According to a particular embodiment, an analog correlator receives the down-converted in-phase and quadrature-phase outputs from the radio section and determines when a received signal is coming up at or near a given noise level. A control circuit is coupled to the correlator to selectively activate flash A/D converters in the digital receiver portion of the baseband processor. The analog correlator replaces the RSSI for "sniffing" whether a received signal is present.

15 Claims, 4 Drawing Sheets

METHOD FOR EXTENDING DIGITAL RECEIVER SENSITIVITY USING ANALOG CORRELATION

BACKGROUND OF THE INVENTION

1. Technical Field

The present invention relates generally to the field of communication electronics and, in particular, to methods for extending the sensitivity of a digital receiver using analog correlation.

2. Description of the Related Art

Spread spectrum is a communication technique that has found widespread use for both military and commercial applications. In a spread spectrum communication system, the transmitted modulation is spread (i.e., increased) in bandwidth prior to transmission over the channel and then despread (i.e., decreased) in bandwidth by the same amount at the receiver.

One of the target applications for spread spectrum is to facilitate wireless or radio communications between separated electronic devices. For example, a wireless local area network (WLAN) is a flexible data communication system that uses radio technology to transmit and receive data over the air, thereby reducing or minimizing the need for wired connections. In a typical WLAN, an access point is provided by a transceiver that connects a wired network from a fixed location. End users connect to the WLAN through transceivers that are typically implemented as PC cards in a laptop computer, or ISA or PCI cards for desktop computers. The transceiver may also be integrated with any device, such as a handheld computer, personal digital assistant, or the like.

The majority of the WLAN products available in the marketplace today are proprietary spread spectrum solutions targeting vertical applications operating in the 900 MHz and 2.4 GHz ISM frequency bands. These products include, as mentioned above, wireless adapters and access points in PCMCIA, ISA and custom PC board platforms. A typical spread spectrum transceiver comprises a conventional IF radio circuit, coupled to a baseband processor, which provides the desired modulation of the signal to be transmitted and the desired demodulation of a signal received at the transceiver. Thus, for example, the baseband processor may perform a given spread spectrum modulation technique such as direct sequence (DS) modulation, frequency hopping (FH) modulation, time hopping (TH) modulation, or hybrid modulations that blend together one or more of the various schemes.

In known spread spectrum transceivers that are designed to comply with the IEEE 802.11 WLAN Standard, the baseband processor typically includes on-board, dual parallel (or "flash") analog-to-digital (A/D) converters for processing the received I (in-phase) and Q (quadrature) signals from the quadrature IF demodulator in the radio section. Flash A/D converters perform the analog-to-digital conversion in one step, as opposed to a successive approximation. In particular, a flash A/D converter simultaneously compares the input analog voltage to $2^n-1$ threshold voltages to produce an n-bit digital code representing the analog voltage. Typically, the baseband processor also includes another flash A/D converter for converting the analog signal provided from a receive signal strength indicator (RSSI) in the radio section.

The RSSI, which gives an indication of the signal power, however, does not work efficiently for a low probability of false detection when the signal is at or near noise level (e.g., −95 dBm in an IEEE 802.11b receiver). In a typical inexpensive receiver (e.g., such as in an ISM 2.4 GHz system for IEEE 802.11b), the RSSI usually operates over the entire range of the input signal as illustrated in FIG. 1. In a mid-range operation, it can be determined from the RSSI output signal that a received signal is coming up. In a noise-only situation, however, with $V_{RSSI}$ at V min, the signal coming up cannot be detected unless it is about 10 dB greater than the noise power so that the probability of false detection is low. This is also illustrated in FIG. 1. Thus, the only way to determine with a low probability of false detection if the signal is at or near the noise level (i.e., when the RSSI is unreliable) is to do a separate correlation. This, in turn, requires that the flash A/D converters be maintained in an ON condition, even though those converters could be turned OFF following message transmission. Flash A/D converters draw large amounts of current and, as a result, exhibit large power consumption.

It would be desirable to increase the sensitivity of the receiver portion of a spread spectrum transceiver when the signal is coming up at or near noise level without having to first turn ON the flash A/D converters to "sniff" for the received signal. The present invention addresses this need.

BRIEF SUMMARY OF THE INVENTION

Analog correlation techniques are used in a digital receiver portion of a spread spectrum transceiver to determine when to turn ON given digital receiver components when the received signal is coming up. According to a particular embodiment, an analog correlator receives the analog I and Q outputs from the radio section and attempts to lock a local pseudorandom number (PN) sequence to a similar sequence in the received signal. When the analog correlator aligns the PN sequences, and if the corresponding correlation peak is sufficiently large, flash A/D converters in the digital receiver portion are turned ON. In effect, the analog correlator "sniffs" for the received signal because the radio signal strength indicator (RSSI) cannot detect received signal onset with a low probability of false alarm when the signal is at or near the noise floor.

In an illustrative embodiment, the analog correlator comprises, for each of the I and Q channels, an analog multiplier, an integrator and dump circuit, a sample-and-hold circuit, and an analog squarer. A pseudorandom (PN) sequence generator supplies a given PN sequence to each of the channels following the application of a selected delay. The PN sequence generator is the generator used to spread each data bit at a predetermined chip rate to supply the spread spectrum modulation. In a representative embodiment, the PN sequence is a Barker PN sequence. In operation, when the signal is at or near the noise level, following PN sequence lock, the correlator output is at a given relative correlation peak at the selected delay. When the given relative correlation peak exceeds a threshold, a control signal is output from the analog correlator to turn ON the flash A/D converters in the digital receiver. As a result, the large power-consuming flash A/D converters are only activated when the received signal is coming up and the relative correlation peak is above a given threshold. They need not be activated to sniff for the received signal, as in the prior art.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
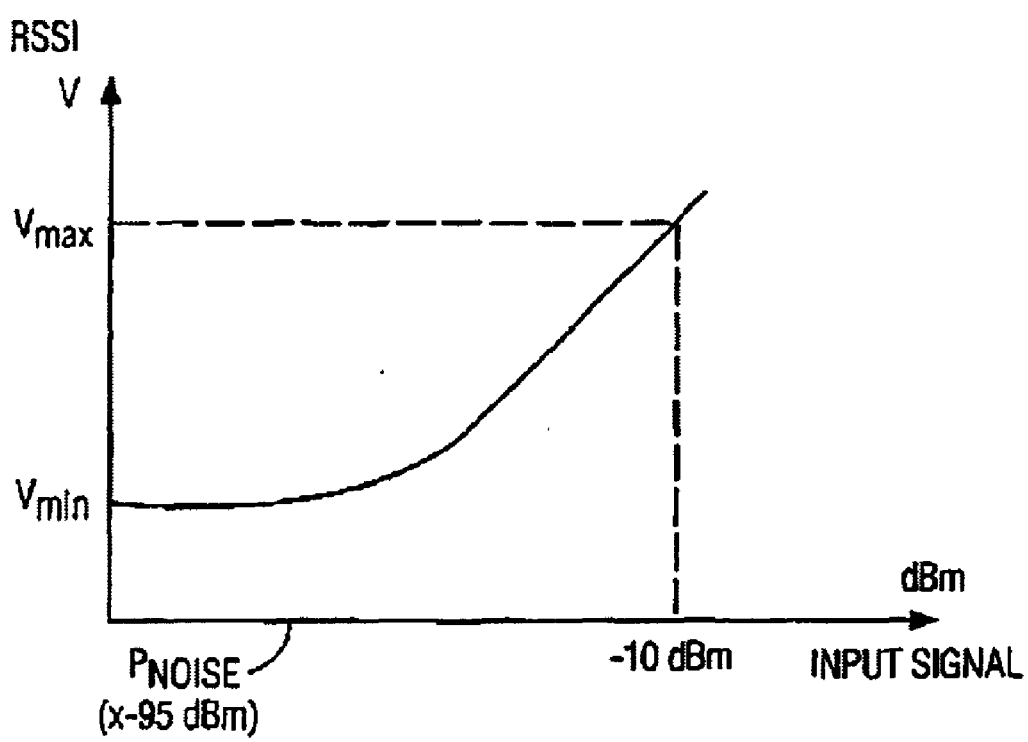
FIG. 1 illustrates the relationship between the received signal strength indicator voltage and the signal strength in a conventional spread spectrum receiver.
Figure 2:
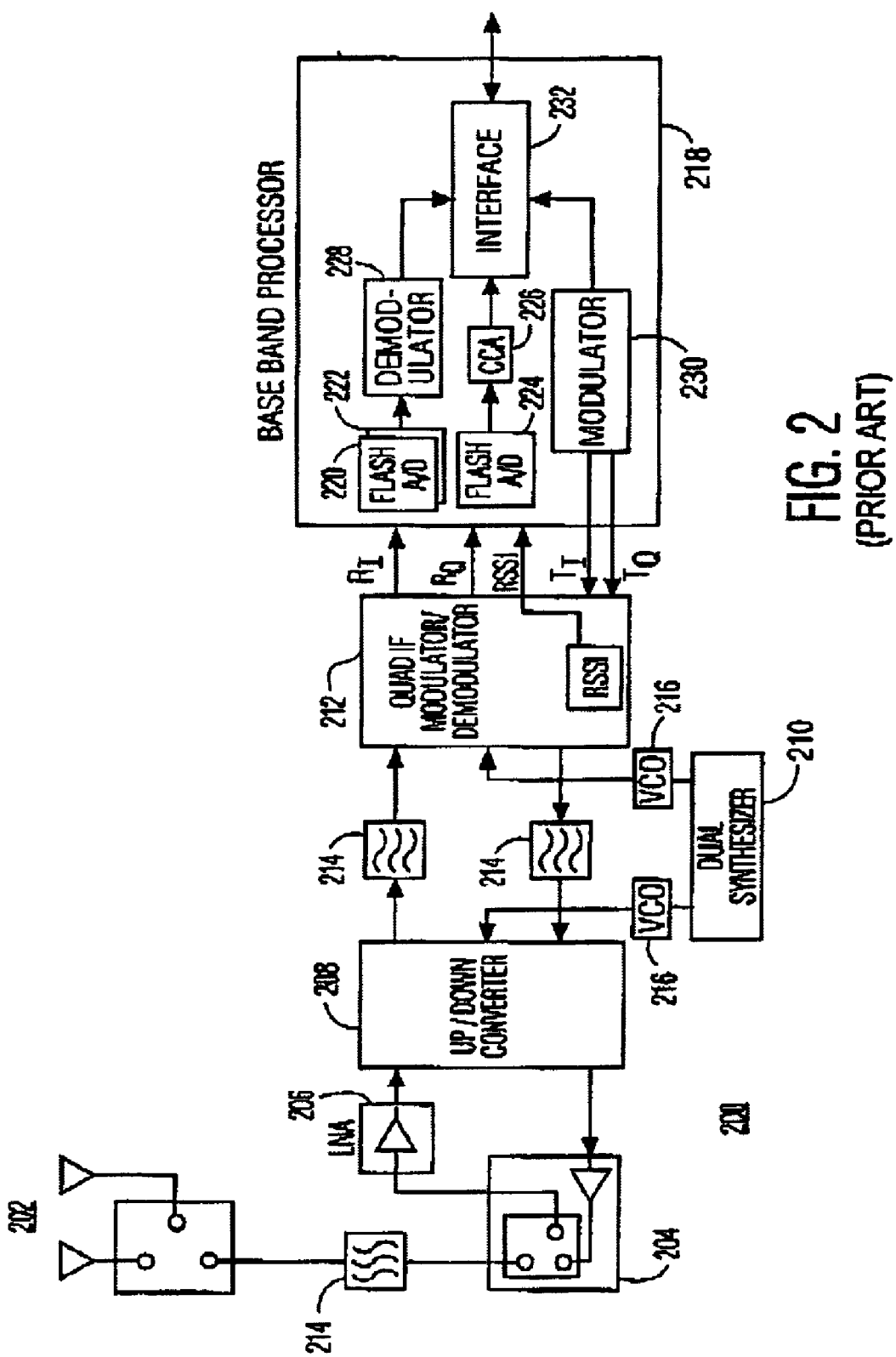
FIG. 2 is a block diagram of the architecture of a representative spread spectrum transceiver of the prior art.

FIG. 2 illustrates a known wireless transceiver 200 in which the present invention may be implemented. The transceiver may be used for WLAN applications in the 2.4 GHz ISM band in accordance with the proposed IEEE 802.11 standard, although this is not a limitation of the present invention. The transceiver comprises selectable antennas 202 coupled to a RF power amplifier and transmit/receive switch 204. A low noise amplifier 206 is also operatively coupled to the antennas. The transceiver also includes an up/down converter 208 connected to both the low noise amplifier 206 and the RF power amplifier and transmit/receive switch 204. The up/down converter 208 is connected to a dual frequency synthesizer 210 and a quadrature IF modulator/demodulator 212. IF modulator/demodulator 212 includes a received signal strength indicator (RSSI) function for providing an RSSI monitoring or "sniffing" function, as is well-known. One or more filters 214 and voltage controlled oscillators (VCOs) 216 may also be provided. The above components comprise a conventional radio portion of the spread spectrum transceiver. Familiarity with the operation of such components is presumed.

A spread spectrum baseband processor 218 is coupled to the radio portion and contains all of the functions necessary to facilitate full or half duplex packet-based spread spectrum communications as is also well-known in the art. In particular, the processor has on-board dual, flash A/D converters 220 and 222 for receiving in-phase (I) and quadrature (Q) signals from the IF modulator 212. The baseband processor also includes another A/D converter 224 for processing the received signal strength indicator (RSSI) voltage from the IF modulator 212. A clear channel assessment (CCA) circuit 226 provides a clear channel assessment function to avoid data collisions and to optimize network throughput. The flash A/D converter outputs are supplied to the demodulator 228, which despreads the received signal. The modulator 230 performs the spreading function, as is well understood. An interface circuit 232 is connected to the both the demodulator 228 and the modulator 230 to interface the data to/from the baseband processor. Again, all of the above components are well-known to one of ordinary skill in the art.

One type of spread spectrum technique is direct sequence modulation. For illustration purposes, the present invention will be described in the context of a direct sequence baseband processor, although this is not a limitation of the invention as will be seen. A direct sequence modulation is formed by linearly modulating an output sequence of a pseudorandom number (PN) generator onto a train of pulses, each having a duration called the chip time. An 11 bit Barker sequence (i.e., +++−−−+−−+−) may be used for this purpose. The use of an 11 bit Barker sequence, of course, is merely exemplary. A Barker sequence is a binary $\{-1,+1\}$ sequence $\{s(t)\}$ of length n having a periodic autocorrelation values $|\rho_s(\tau)|<1$ for all $\tau$, $-(n-1)<\tau<n-1$. Typically, this type of modulation is used with binary phase-shift-keyed (BPSK) information signals. A direct sequence BPSK signal is generated by multiplying the BPSK signal by the direct sequence modulation. To demodulate a received BPSK signal, a local PN random generator (which generates the PN waveform at the receiver used for despreading) must be synchronized to within one chip of the PN waveform of the received BPSK signal. This function is done by a search routine that steps the local PN waveform sequentially in time by a fraction of a chip and, at each position, searches for a high degree of correlation between the received and local PN reference waveforms. The search ends when the correlation exceeds a given threshold, which is an indication that a coarse alignment has been achieved. After bringing the two PN waveforms into coarse alignment, a delay-locked or tau-dither tracking loop is used to maintain a fine alignment. Further details of this process are described, for example, in *The Communications Handbook*, 16.4 (1997), CRC Press, which is incorporated herein by reference.

Figure 3:
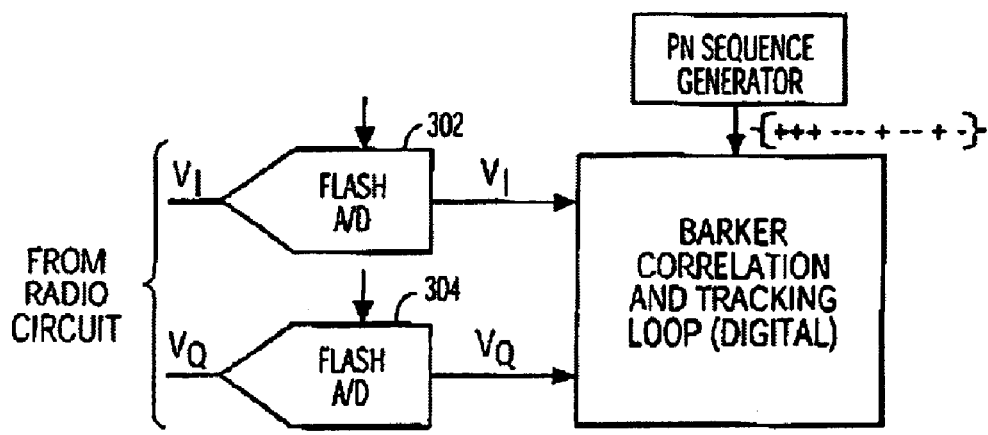
FIG. 3 is a block diagram of the components of the baseband processor of the spread spectrum transceiver of FIG. 2.

FIG. 3 illustrates the baseband processor 300 and its associated flash A/D converters 302 and 304. Theoretically, flash converters 302 and 304 could be turned OFF following the end of message (EOM) transmission (unless an acknowledgment is expected). In the prior art, however, this has not been practical. In particular, given the high probability of false alarm at the output when the signal is less than 10 dB above the noise of the RSSI, it is not possible for the RSSI output to be used effectively to determine when the received signal strength is less than about 10 dB above the noise floor (about −95 dBm). Thus, in the prior art, the flash A/D converters must remain ON to "sniff" for the received signal onset near the noise floor (between about −95 and −85 dBm). The flash A/D converters, which are required for that correlation, draw a large amount of current. To overcome this problem, and to reduce the overall power consumption of the digital receiver, the present invention extends the digital receiver sensitivity by sniffing for the received signal with a low power analog correlator. When the analog correlator detects a correlation peak indicating the presence of the received signal, the flash A/D converters in the main baseband processor are turned ON. The components of the analog correlator are low power devices and, as a result of limiting the use of the flash A/D converters, the overall power consumption of the transceiver is significantly reduced as compared to the prior art.

Figure 4:
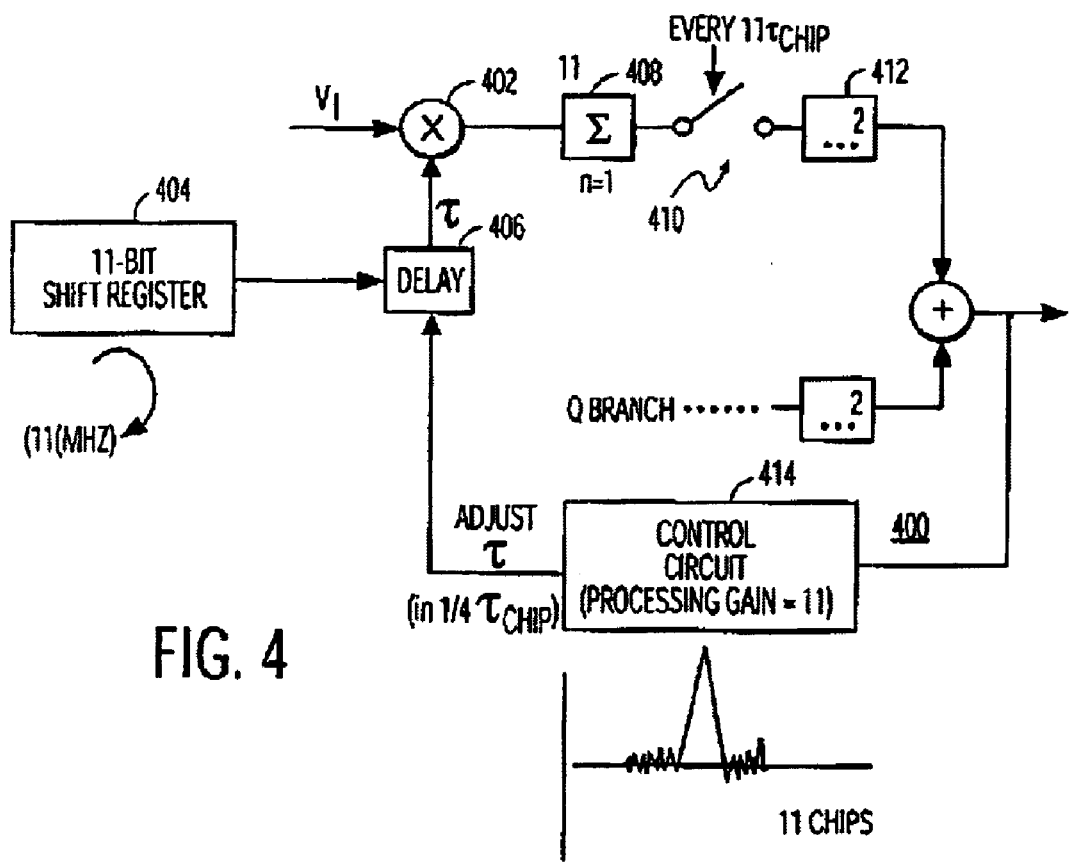
FIG. 4 is a block diagram of an analog correlator illustrating the basic operating principle of the present invention.

FIG. 4 illustrates the basic operation of the analog correlator 400. Generally, the analog correlator is used to synchronize a local PN sequence (e.g., an 11 bit Barker) to a similar PN sequence in the sampled down-converted in-phase and quad-phase signals $V_I$ and $V_Q$. When the analog correlator aligns the PN sequence, and if the relative correlation peak is larger than a threshold, the flash A/D converters in the digital portion of the receiver section are turned ON. These converts are normally OFF following EOM transmission.

In this figure, only the in-phase (I) signal from the IF demodulator is shown as being processed. Of course, the correlator 400 includes a similar loop for processing the quadrature phase (Q) signal. As illustrated, the $V_I$ signal from the IF demodulator stage is mixed in analog multiplier 402 with a Barker sequence generated by the 11 bit shift register 404 after that sequence is delayed, by delay circuit 406, by an amount τ. The 11 bit shift register operates at a given frequency, e.g., 11 MHz. The output of the analog mixer 402 is summed by sum circuit 408 and then sampled by sample circuit 410. The sample rate in this example is every 11 chips. The sampled output is then squared in squaring circuit 412 and added to the similarly-derived output for the Q signal, with the result supplied to a control circuit 414. In operation, the shift register output is synchronized to within one chip of the Barker waveform in the received $V_I$ signal and the received $V_Q$ signal. The control circuit then generates a signal to adjust the delay τ provided by the delay circuit 406 to maintain the Barker sequences in alignment. When the sequences are aligned the correlator has a given processing gain of, in the illustrated example, approximately 11. When the processing gain indicates a correlation peak above a given threshold, the received signal onset has occurred and the flash A/D converters are activated.

Figure 5:
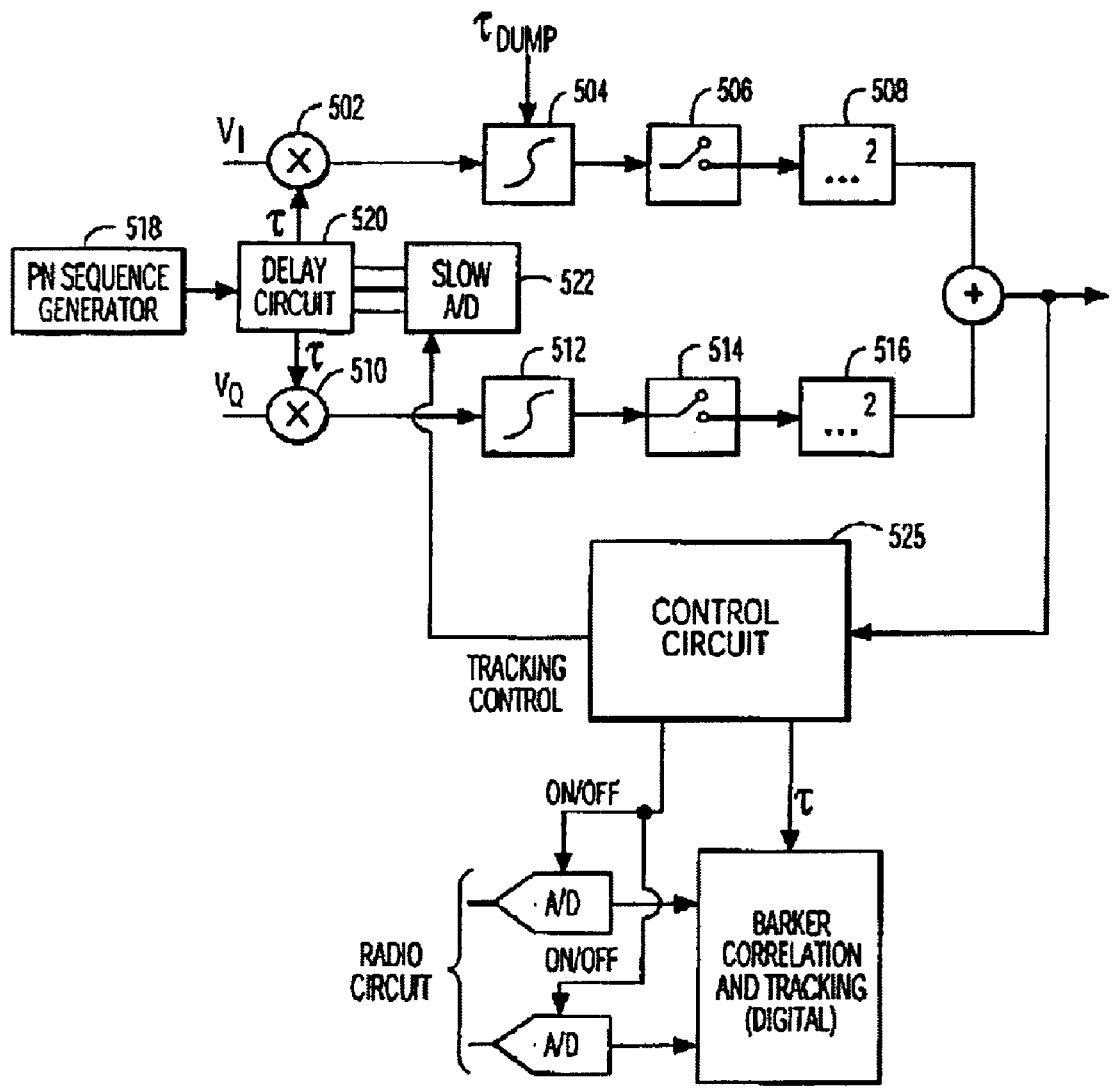
FIG. 5 is a more detailed block diagram illustrating how an analog correlator is used to control the digital receiver circuitry when the signal strength is at or near the noise level according to the present invention.

FIG. 5 illustrates a preferred embodiment of the analog correlator 500 of the present invention for use in detecting the presence of the received signal when the signal is coming up at or near the noise floor. The correlator comprises an I channel branch including analog multiplier 502, integrator and dump circuit 504, sample and hold circuit 506 and analog squaring circuit 508. The Q channel branch comprises analog multiplier 510, integrator and dump circuit 512, sample and hold circuit 514 and analog squaring circuit 516. Each branch is supplied with its respective $V_I$ and $V_Q$ signal together with the Barker (or other PN) sequence supplied from the PN generator 518. As in FIG. 4, the PN sequence is delayed by a given amount τ by the delay circuit 520. The control circuit 525 generates a control signal that is converted to digital form by slow A/D converter 522 and used to control the delay circuit 520. A/D converter 522 and delay circuit 520 comprise a conventional tau-dither tracking loop. In operation, a peak correlation occurs when the PN sequences (from the PN generator and each respective I and Q signal) are within one chip. At this point, the control circuit 525 generates an output signal that is used by the tracking loop to set the delay τ so that the correlation remains at the peak value. When the correlation peak is above a given threshold, the control circuit 525 generates an output that activates the flash A/D converters 524 and 526 to an ON condition. As noted above, the converters 524 and 526 are normally OFF following an EDM transmission.

The control circuit may be implemented in any convenient manner, e.g. a software-driven processor, a microcontroller, a finite state machine, in handwired logic, an application-specific integrated (ASIC), a field programmable gave array (FPGA), a digital signal processor (DSP), or the like. Once the delay is determined, the control circuit may provide this value to the digital receiver to facilitate correlation by the digital components.

The analog correlator operates to detect when the received signal is coming up at or near the noise level (when the RSSI is otherwise ineffective). When a correlation peak occurs, the flash A/D converters are turned ON. This intelligent control of the flash A/D converters provides improved power management in the baseband processor and thus improved overall performance of the spread spectrum transceiver.

One of ordinary skill in the art will recognize that the analog correlation is of a relatively low quality from a signal detection point of view; on the contrary, the corresponding Barker correlation (performed in the digital receiver circuitry) provides a high quality signal detection. Thus, by way of generalization, the inventive technique utilizes an analog-correlator for low quality signal detection and the normal digital correlator for high quality signal detection.

Having thus described my invention, what I claim as new is set forth in the following claims:

1. In a spread spectrum transceiver comprising a radio circuit coupled to a baseband processor, the baseband processor including a spread spectrum despreader and flash A/D converters for sampling down-converted in-phase and quadrature-phase signals received from the radio circuit, the improvement comprising:

an analog correlator for detecting when a received signal is coming up at or near a given noise level; and a control circuit coupled to the analog correlator for selectively activating the flash A/D converters, wherein the analog correlator comprises a pseudorandom number (PN) sequence generator, an in-phase section, and a quadrature phase section.

2. In the spread spectrum transceiver as described in claim 1 wherein the in-phase section comprises:

an analog multiplier for receiving the down-converted in-phase signal from the radio circuit and a bit sequence generated by the PN sequence generator and, in response thereto, generating a first signal;

an integrator and dump circuit for integrating the first signal over a given time period to generate a second signal;

a sample and hold circuit for sampling the second signal and generating a third signal; and an analog squaring circuit for squaring the third signal and generating a fourth signal.

3. In the spread spectrum transceiver as described in claim 1 wherein the quadrature phase section comprises:

an analog multiplier for receiving the down-converted quadrature-phase signal from the radio circuit and a bit sequence generated by the PN sequence generator and, in response thereto, generating a first signal;

an integrator and dump circuit for integrating the first signal over a given time period to generate a second signal;

a sample and hold circuit for sampling the second signal and generating a third signal; and an analog squaring circuit for squaring the third signal and generating a fourth signal.

4. In the spread spectrum transceiver as described in claim 1 wherein the PN sequence generator generates a Barker sequence.

5. In the spread spectrum transceiver as described in claim 4 wherein the Barker sequence is an 11 bit Barker.

6. In the spread spectrum transceiver as described in claim 1, further including:

a tracking loop for maintaining a PN sequence output from the PN sequence generator in alignment with a PN sequence in the down-converted in-phase and quadrature-phase signals received from the radio circuit.

7. A transceiver, comprising:

a radio circuit;

a baseband processor coupled to the radio circuit and including a demodulator and A/D converters for sampling down-converted in-phase and quadrature-phase signals received from the radio circuit;

a PN sequence generator;

an analog correlator for detecting when a received signal is coming up at or near a given noise level;

a tracking loop for maintaining a PN sequence output from the PN sequence generator in alignment with a PN sequence in the down-converted in-phase and quadrature-phase signals received from the radio circuit following detection of the received signal; and a control circuit coupled to the analog correlator for selectively switching the flash A/D converters from an OFF condition to an ON condition.

8. The transceiver as described in claim 7 wherein the demodulator is a spread spectrum despreader.

9. The transceiver as described in claim 8 wherein the PN sequence is a Barker sequence.

10. The transceiver as described in claim 7 wherein the A/D converters are flash A/D converters.

11. The transceiver as described in claim 7 wherein the analog correlator comprises an in-phase section comprising:

an analog multiplier for receiving a down-converted in-phase signal from the radio circuit and the bit sequence generated by the PN sequence generator and, in response thereto, generating a first signal;

an integrator and dump circuit for integrating the first signal over a given time period to generate a second signal;

a sample and hold circuit for sampling the second signal and generating a third signal; and an analog squaring circuit for squaring the third signal and generating a fourth signal.

12. The transceiver as described in claim 7 wherein the analog correlator comprises an quadrature-phase section comprising:

an analog multiplier for receiving a down-converted quadrature-phase signal from the radio circuit and the bit sequence generated by the PN sequence generator and, in response thereto, generating a first signal;

an integrator and dump circuit for integrating the first signal over a given time period to generate a second signal;

a sample and hold circuit for sampling the second signal and generating a third signal; and an analog squaring circuit for squaring the third signal and generating a fourth signal.

13. A spread spectrum transceiver for use in a wireless local area network (WLAN), comprising:

a radio circuit;

a baseband processor coupled to the radio circuit and including a spread spectrum despreader and digital circuitry for high quality signal detection;

an analog correlator for sniffing for a received signal; and circuitry coupled to the analog correlator for selectively activating the digital circuitry to enable high quality signal detection;

wherein the analog correlator includes means for synchronizing a local PN sequence to a PN sequence in a received signal and, in response thereto, generating a given delay value.

14. The transceiver as described in claim 13 wherein the given delay value is used by the digital circuitry for a given correlation.

15. The transceiver as described in claim 13 wherein the WLAN is compliant with the IEEE 702.11 standard.

* * * * *